(No Model.) 2 Sheets—Sheet 1.
W. Q. PREWITT.
TROLLEY TRACK HANGER FOR ELECTRIC RAILWAYS.
No. 483,388. Patented Sept. 27, 1892.
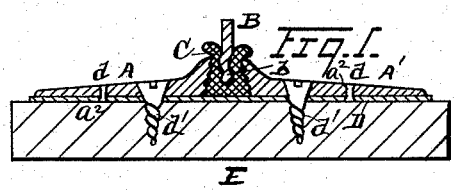
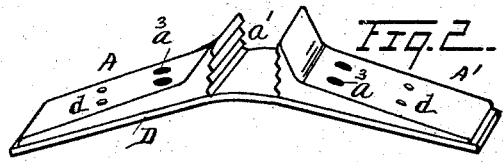
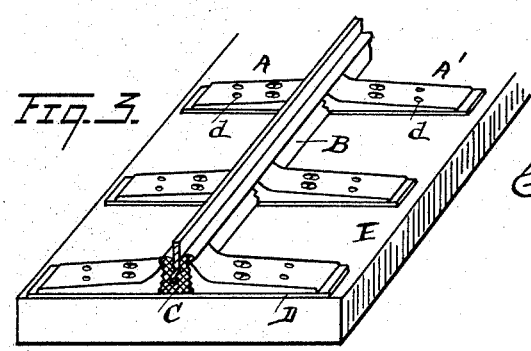
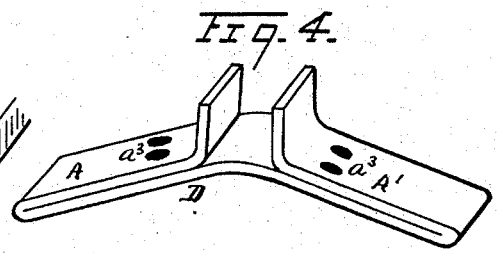
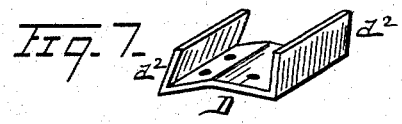
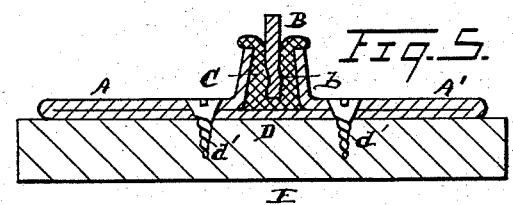
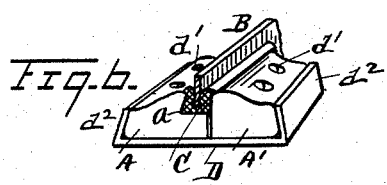
Witnesses
John Schumann
John F. Miller
Inventor
William Q. Prewitt.
By his Attorney
Newell S. Wright (No Model.) 2 Sheets—Sheet 2.
W. Q. PREWITT.
TROLLEY TRACK HANGER FOR ELECTRIC RAILWAYS.
No. 483,388. Patented Sept. 27, 1892.
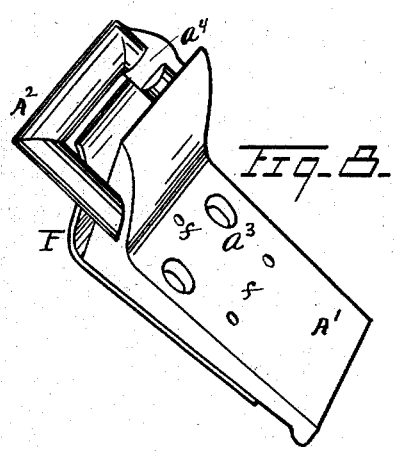
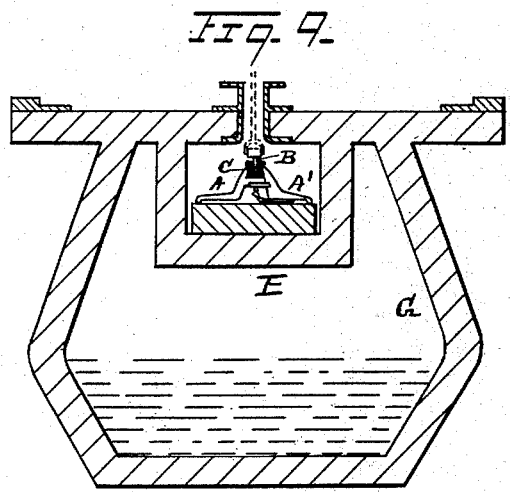
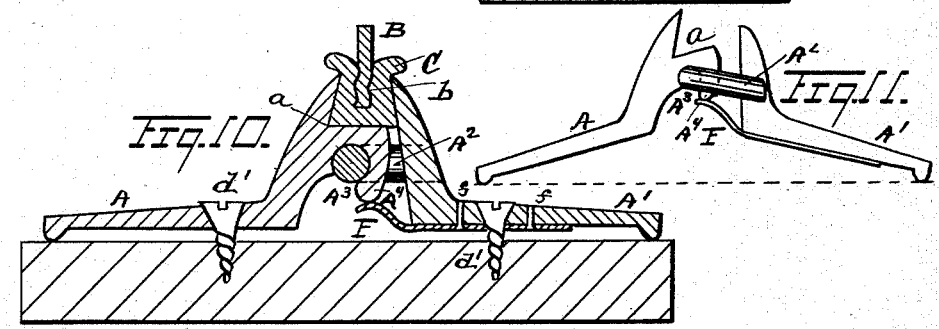
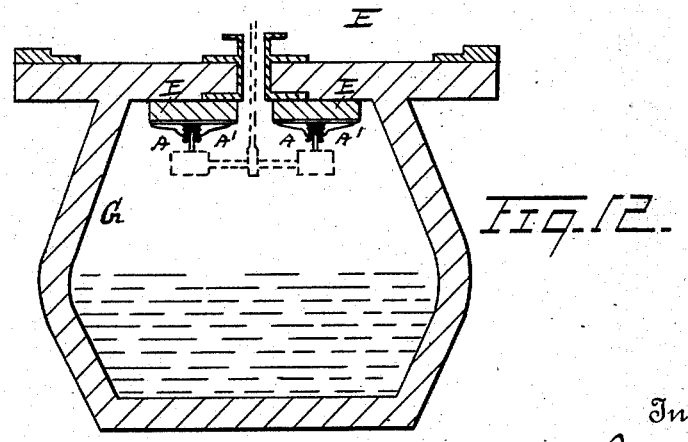
Witnesses
John Schuman.
John F. Miller.
Inventor
William Q. Prewitt.
By his Attorney
Newell S. Wright

UNITED STATES PATENT OFFICE.

WILLIAM Q. PREWITT, OF LEXINGTON, KENTUCKY.

TROLLEY-TRACK HANGER FOR ELECTRIC RAILWAYS.

SPECIFICATION forming part of Letters Patent No. 483,388, dated September 27, 1892.

Application filed October 17, 1891. Serial No. 408,988. (No model.)

*To all whom it may concern:*

Be it known that I, WILLIAM Q. PREWITT, a citizen of the United States, residing at Lexington, county of Fayette, State of Kentucky, have invented a certain new and useful Improvement in Trolley-Track Hangers; and I declare the following to be a full, clear, and exact description of the invention, such as will enable others skilled in the art to which it appertains to make and use the same, reference being had to the accompanying drawings, which form a part of this specification.

My invention relates to a certain new and useful improvement in a trolley-track hanger where the slide-shoe trolley or the wheel-trolley is used to lead the current from an electric conductor to electric motor on carriages for power, lights, or bell-ringing, such as for electric-railway cars or other movable carriages.

It consists of the devices and appliances, their combinations and arrangements, as hereinafter specified, claimed, and illustrated in the accompanying drawings, in which—

Figure 1 is a view in vertical section of the device in place. Fig. 2 shows the hanger ready to receive the track. Fig. 3 is a view showing several hangers in place on a supporting-bed. Fig. 4 is a view of a modification of the hanger ready to receive the track. Fig. 5 is a sectional view of the same in place. Fig. 6 is another modification showing the jaws of the hanger closed upon the track. Fig. 7 is a separate view of the flexible strip employed in the device shown in Fig. 6. Fig. 8 is a separate view of one of the jaws employed in another modification of the hanger. Fig. 9 shows a conduit in section with features of my invention illustrated in connection therewith. Fig. 10 is a sectional view of the modification partly illustrated in Fig. 8. Fig. 11 is a view of the same hanger ready to receive the track, and Fig. 12 is another sectional view of a conduit in which my invention is applied.

My invention is intended to provide a track-hanger of this description which shall be simple, economical, and of superior efficiency.

A former application made by me March 26, 1891, Serial No. 386,473, embodied two track-clamping members having a jointed union with each other.

The main feature of my present invention is to provide a trolley-track hanger in which two clamping members have a flexible engagement one with the other in a novel manner.

Accordingly A and A' represent two clamping members or jaws, their adjacent edges so formed as to hold and bind firmly between them a suitable trolley-track B when the said members are secured in place. While I do not limit myself to any particular construction of the adjacent edges, one member may be constructed with a channel $a$, against which the opposite member closes to hold the track therein; or the members may be formed with their adjacent edges serrated or milled to more firmly grip the track in the channel therebetween, as shown at $a'$. The members are also provided with laterally-extended securing-flanges, as shown. Suitable insulation C may be interposed between the track and the members. These two members are provided with an underlying flexible strip in any desired manner, designed to support the said members in an open position, their jaws being ready to receive the track and allowing said members to be forced downward upon a supporting-bed to close the jaws upon the track and hold it firmly in position. Thus, for example, both members may be secured upon an underlying flexible strip D, as of sheet metal or other flexible material, the members being united to the ends of said strip in any suitable way, as by rivets $d$, the securing-flanges of the members being provided with perforations, as shown at $a^2$, to receive said rivets, and also with perforations $a^3$, through which screws $d'$ engage the hanger to a base or support E, a series of hangers being secured to a suitable support to carry the track. With a hanger so constructed the flexible strip D allows the jaws to be open to receive the track, and also to be forced down into engagement with the support E, closing the jaws firmly upon the track. Instead, however, of making the members and the flexible support in separate parts united together, they may be made in a single integral piece, as shown in Figs. 4 and 5, or, again, as shown in Figs. 8 and 11, one of the members may be provided with a spring supporting-strip F, bearing against the opposite member, the strip F being located below and normally supporting the members in an open position to receive the track, the members being detachable. To this end one of the jaws may be provided with a projecting loop $A^2$ and the other jaw with a recess $A^3$ to engage the loop, one side of the loop being recessed, as shown at $a^4$, to allow the loop to pass into the recess $A^3$. In forming the recess $A^3$ the corresponding jaw is provided with a lip $A^4$, said lip having a bearing on the supporting-strip F, engaged with the opposite jaw, as by rivets $f$. These jaws or members are engaged upon the support E, as in other modifications of the invention, thereby closing them upon the track, the spring-supporting strip F holding the jaws open when free to operate. It will be seen that this method of engaging the members illustrated in Figs. 8 to 11 forms a jointed union the one with the other.

G denotes a conduit in which my improved hanger is shown in position.

While I do not limit myself to any specific form of track, it will facilitate the firm holding of the track in place to corrugate its base, as shown at $b$. The insulation may be in the form of an insulating-trough to receive the track, its sides conforming to the corrugated base of the track when the jaws are closed thereupon. While, moreover, I do not limit myself to constructing the members or jaws A A' of any particular material, they may be made of glass or porcelain, in which case, as shown in Figs. 6 and 7, the flexible supporting-strip may be provided with upturned extremities $d^2$, engaging the outer edges of the members.

If the members are made of metal, I prefer to have them painted or enameled, so as to render them to the fullest possible extent a non-conductor.

By making the groove for the track in the form of a dovetail the members may more securely clamp the track therein, although I do not limit myself thereto.

What I claim as my invention is—

1. In a trolley-track hanger, two clamping members provided with an underlying flexible support, said members having a channel between their adjacent edges to receive the track, substantially as described.

2. In a trolley-track hanger, two clamping members channeled between their adjacent edges to receive the track and provided with an underlying flexible support, said members having laterally-extended securing-flanges, substantially as described.

3. In a trolley-track hanger, two clamping members having a channel to receive the track between their adjacent edges, said edges being milled or serrated, substantially as described.

4. In a trolley-track hanger, the combination, with a base, of a series of track-hangers engaged thereupon, said hangers each constructed with two clamping members provided with a channel to receive the track between their meeting edges and provided with an underlying flexible support, substantially as described.

5. In a trolley-track hanger, the combination, with a base, of two clamping members secured thereupon provided with an underlying flexible support and having a channel to engage a track between their adjacent edges, the members being supported in an open position before the engagement of the track in said channel and arranged to close upon the track when brought firmly into engagement with said base, substantially as described.

6. In a trolley-track hanger, two clamping members having a channel between their meeting edges to receive a track, one member provided with a loop and the other member with a recessed lip to receive said loop, and a flexible support located beneath and engaging both members, substantially as described.

7. In a trolley-track hanger, two clamping members having a jointed engagement one with the other and provided with a channel between their meeting edges to receive a track, and a flexible support located below said members, substantially as described.

In testimony whereof I sign this specification in the presence of two witnesses.

WILLIAM Q. PREWITT.

Witnesses:
AARON SMICK,
J. M. GRAY.